(12) United States Patent
Repela et al.

(10) Patent No.: US 10,696,120 B2
(45) Date of Patent: Jun. 30, 2020

(54) LEVELING VALVE FOR DISCHARGING AND SUPPLYING FLUID

(71) Applicant: WABCO Europe BVBA, Brussels (BE)

(72) Inventors: Marek Repela, Wroclaw (PL); Przemyslaw Zak, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 65 days.

(21) Appl. No.: 15/972,279

(22) Filed: May 7, 2018

(65) Prior Publication Data

US 2018/0319240 A1 Nov. 8, 2018

(30) Foreign Application Priority Data

May 8, 2017 (EP) .................................. 17000787

(51) Int. Cl.
| | |
|---|---|
| *B60G 17/00* | (2006.01) |
| *B60G 17/052* | (2006.01) |
| *F16K 47/02* | (2006.01) |
| *F16K 11/074* | (2006.01) |
| *B60G 17/056* | (2006.01) |

(52) U.S. Cl.
CPC ....... *B60G 17/0525* (2013.01); *B60G 17/056* (2013.01); *B60G 17/0523* (2013.01); *B60G 17/0565* (2013.01); *F16K 11/074* (2013.01); *F16K 47/02* (2013.01); *B60G 2500/202* (2013.01)

(58) Field of Classification Search
CPC .......... B60G 17/0525; B60G 2500/202; F16K 11/074; F16K 47/02
USPC ..................................................... 280/6.157
See application file for complete search history.

(56) References Cited

U.S. PATENT DOCUMENTS

| | | | | |
|---|---|---|---|---|
| 2,965,373 A | * | 12/1960 | Heiss ................... | B60G 17/048 267/64.18 |
| 3,162,433 A | | 12/1964 | Smirl | |
| 3,203,449 A | | 8/1965 | Alfieri | |
| 4,340,353 A | * | 7/1982 | Mayer ................... | B29C 45/263 264/106 |

(Continued)

FOREIGN PATENT DOCUMENTS

| | | |
|---|---|---|
| EP | 2806194 A1 | 11/2014 |
| GB | 860034 A | 2/1961 |
| WO | 2010089089 A1 | 8/2010 |

OTHER PUBLICATIONS

European Patent Office, The Hague, European Search Report of European Patent Application No. 17 00 0787 dated Sep. 26, 2017, 2 pages.

*Primary Examiner* — Paul N Dickson
*Assistant Examiner* — Hilary L Johns
(74) *Attorney, Agent, or Firm* — Dickinson Wright PLLC

(57) ABSTRACT

A leveling valve (101) for discharging and supplying air from and to a plurality of utilization elements (205*a, b*), in particular pneumatic suspension bellows, includes a valve arrangement (103) for directing air between a source (207) of pressurized air, an exhaust port (3) and the utilization elements, a supply port (1) in fluid communication with the valve arrangement (103) and the source (207) of pressurized air, and an exhaust port (3) having an exhaust air channel (a) for discharging exhaust air. The exhaust port (3) includes at least one air-permeable damping element, which is at least partly positioned within the exhaust air channel (a).

14 Claims, 4 Drawing Sheets

(56) References Cited

U.S. PATENT DOCUMENTS

| | | | | |
|---|---|---|---|---|
| 4,391,579 | A * | 7/1983 | Morrison | B29C 45/263 |
| | | | | 425/548 |
| 4,886,092 | A * | 12/1989 | Barzelay | B60G 17/0525 |
| | | | | 137/627.5 |
| 5,934,320 | A * | 8/1999 | O'Reilly | F16K 3/04 |
| | | | | 137/270 |
| 7,192,033 | B2 * | 3/2007 | Bolt | B60G 11/27 |
| | | | | 280/124.157 |
| 7,204,478 | B2 * | 4/2007 | Plath | B60G 17/0525 |
| | | | | 267/64.17 |
| 7,503,902 | B2 * | 3/2009 | Jensen | A61M 39/223 |
| | | | | 251/149.2 |
| 2003/0038412 | A1 * | 2/2003 | Plath | B60G 17/0525 |
| | | | | 267/64.16 |
| 2004/0120619 | A1 * | 6/2004 | Chai | F16M 11/08 |
| | | | | 384/420 |
| 2006/0175775 | A1 * | 8/2006 | Bolt | B60G 11/27 |
| | | | | 280/5.514 |
| 2008/0217815 | A1 * | 9/2008 | Akopyan | B29C 45/53 |
| | | | | 264/314 |
| 2008/0252025 | A1 * | 10/2008 | Plath | B60G 9/003 |
| | | | | 280/5.514 |
| 2014/0144526 | A1 * | 5/2014 | Russell | E21B 21/10 |
| | | | | 137/512.2 |
| 2014/0265172 | A1 * | 9/2014 | Koelzer | F16K 11/0525 |
| | | | | 280/5.514 |
| 2014/0346748 | A1 * | 11/2014 | Harla | B60G 11/27 |
| | | | | 280/124.16 |

\* cited by examiner

LEVELING VALVE FOR DISCHARGING AND SUPPLYING FLUID

TECHNICAL FIELD

The present invention relates to a leveling valve for discharging and supplying air from and to a plurality of utilization elements, in particular pneumatic suspension bellows, the leveling valve comprising: a valve arrangement for directing air between a source of pressurized air, an exhaust port and the utilization elements, and a supply port in fluid communication with the valve arrangement and the source of pressurized air, and an exhaust port having an exhaust air channel for discharging exhaust air.

BACKGROUND

Leveling valves of the aforementioned type are for example known from WO 2010/089089 or EP 2 806 194 A1.

Leveling valves of the known type are used to regulate the vertical clearance of a vehicle such as a truck or other utility vehicle with respect to ground level. Depending on the load situation of the vehicle or depending upon dynamic forces acting on the utilization elements such as pneumatic suspension bellows of a vehicle, it is in certain situations necessary to increase or decrease the suspension level of the utilization elements. This is achieved by switching the leveling valve, in particular the valve arrangement, from its neutral position to either an "exhaust" switching position or an "air supply" switching position. Depending on the switching position, air will be exhausted from the utilization elements into the atmosphere, or will be supplied to the utilization elements from a source of pressurized air.

The leveling valve known from WO 2010/089089 focuses on ways of decreasing the number of sealing elements used inside a valve by making a non-rotatable valve disc axially movable inside a valve housing, wherein the two valve discs are pressed against each other by pressure prevailing in either a line connected to the source of pressurized air or in a line connected to the utilization elements.

EP 2 806 194 focuses on providing an improved leveling valve with better reactivity when switched and with less noise emission. EP 2 806 194 suggests to employ rotatable valve discs for controlling the effective flow cross-section in a flow path between a source of pressurized air or the exhausted port in the utilization elements. In particular, it is suggested to provide a step increase in flow cross-section by means of the valve discs rotatable with respect to each other. Further, by providing a sudden increase in flow cross-section at low rotation angles, followed by a comparatively shallow increase at higher rotation angles, a good reactivity of the valve is achieved at low rotation angles, while the acoustic noise of the valve is reduced by means of the comparatively shallow increase at higher rotation angles of the rotatable valve discs.

While EP 2 806 194 achieves a noise reduction, there is still a need for further improvement.

SUMMARY

It is therefore an object of the present invention to provide a leveling valve with reduced noise emission.

The object of the invention is achieved according to one aspect with a leveling valve according to claim 1.

In particular, the leveling valve according to invention has an exhaust port comprising at least one air-permeable damping element, which is at least partly positioned within the exhaust air channel. The air-permeable damping element is configured for reducing the emission of noise from the exhaust port to the environment of the leveling valve. The invention is based upon the idea that positioning of an air permeable element through which the pressurized air can flow reduces the noise emission during the flow of exhaust air through the exhaust air port. The necessary adaptations to integrate such air permeable damping element into the exhaust port are relatively simple, such that the noise emission reduction according to the invention is available with low efforts and relatively low cost.

In one example, the damping element comprises or consists of a textile material, preferably felt, wool felt, plastic felt, nonwovens or textile mesh.

These materials are robust and durable and effective as a damper element for reducing noise emission from the exhaust port. Further, these materials, depending on their specific properties, have the capability to filter out particles or oil from the exhaust air flow. A suitable material, for example, is wool felt, since it combines good damping qualities and durability.

Preferably, the damping element has a density in the range of 0.19 g/cm$^3$, preferably 0.19+/−0.1 g/cm$^3$, to the advantageous effect that the noise reduction is efficient and the flow resistance of the damping element relatively low.

In another example, the damping element has an air-permeability of 210 L/min preferably in a range of 190-210 L/min. This improves the air flow resistance.

Preferably, the damping element has an oil absorption capability in a range of 360-420% by weight.

According to a further example, the damping element has the shape of a ring, preferably a cylindrical ring having a cylindrical through bore, wherein preferably the inner diameter of the cylindrical through bore is in a range of 6-8 mm, preferably 7.5 mm. This design ensures a stable position of the damping element within the exhaust air channel over a long period of time.

The damping element may have an outer diameter in a range of 15-19 mm, preferably 17 mm and/or a length, measured in the direction of the flow within the exhaust air channel, in a range of 8-12 mm, preferably 10 mm.

In a further example, the damping element is positioned within a tubular recess within the housing of the valve, so that the damping element for reducing noise emission is safely integrated within the housing so that no further parts need to be attached to the housing of a valve.

In an alternative example, the damping element is positioned within a protruding, preferably tubular sleeve extension section connected with the housing of the leveling valve. This design alternative is also relatively simple as regards of the construction and allows a retrofit of the noise reducing damping element to an existing housing.

The damping element may be positioned upstream of an air flap and/or a washer element within the exhaust air channel, so that the noise reducing damping element is safely positioned and controls the exhaust gas flow through the exhaust port together with the flap.

In another example, the damping element is positioned around a central positioning element extending through an axial bore of the damping element and being positioned centrally within the exhaust air channel, and wherein the damping element is positioned within a tubular sleeve or tubular section of the housing of the leveling valve. The damping element may have a density in the range of 0.19+/−0.1 g/cm$^3$ or an air permeability of at least 200 L/min or a diameter/length ratio D/L in the range of 1.5 to 2, or any combination thereof.

The noise reducing effect of the damper element is further improved and optimized without a negative impact on the flow of exhaust air through the port.

According to a further aspect, an air suspension system for use in a vehicle, in particular for use in a commercial vehicle, may include a plurality of utilization elements, in particular suspension bellows, a leveling valve for discharging and supplying air from and to the utilization elements, and a source of pressurized air connected to a supply port of the leveling valve. The invention achieves the object described hereinabove by providing a leveling valve according to any one of the examples described hereinabove in the air suspension system.

In a further aspect, a vehicle, in particular commercial vehicle, may include a plurality of tires mounted on a vehicle axle, a super structure and an air suspension system axle coupling the axle to the super structure, wherein the air suspension system is an air suspension system as described hereinabove.

Further details and benefits of the invention will be described in the following with reference to the accompanying drawings, illustrating an example of the invention. It should of course be understood that various modifications and changes in form or detail could readily been made without departing from the spirit of the invention. It is therefore intended that the invention may not be limited to the exact form and detail shown and described herein, nor to anything less than the whole of the invention disclosed herein and as claimed hereinafter. Further the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

BRIEF DESCRIPTION OF THE DRAWINGS

In the drawings,

as shown in FIG. 1 and FIG. 2.

DETAILED DESCRIPTION OF THE DRAWINGS

Figure 1A:
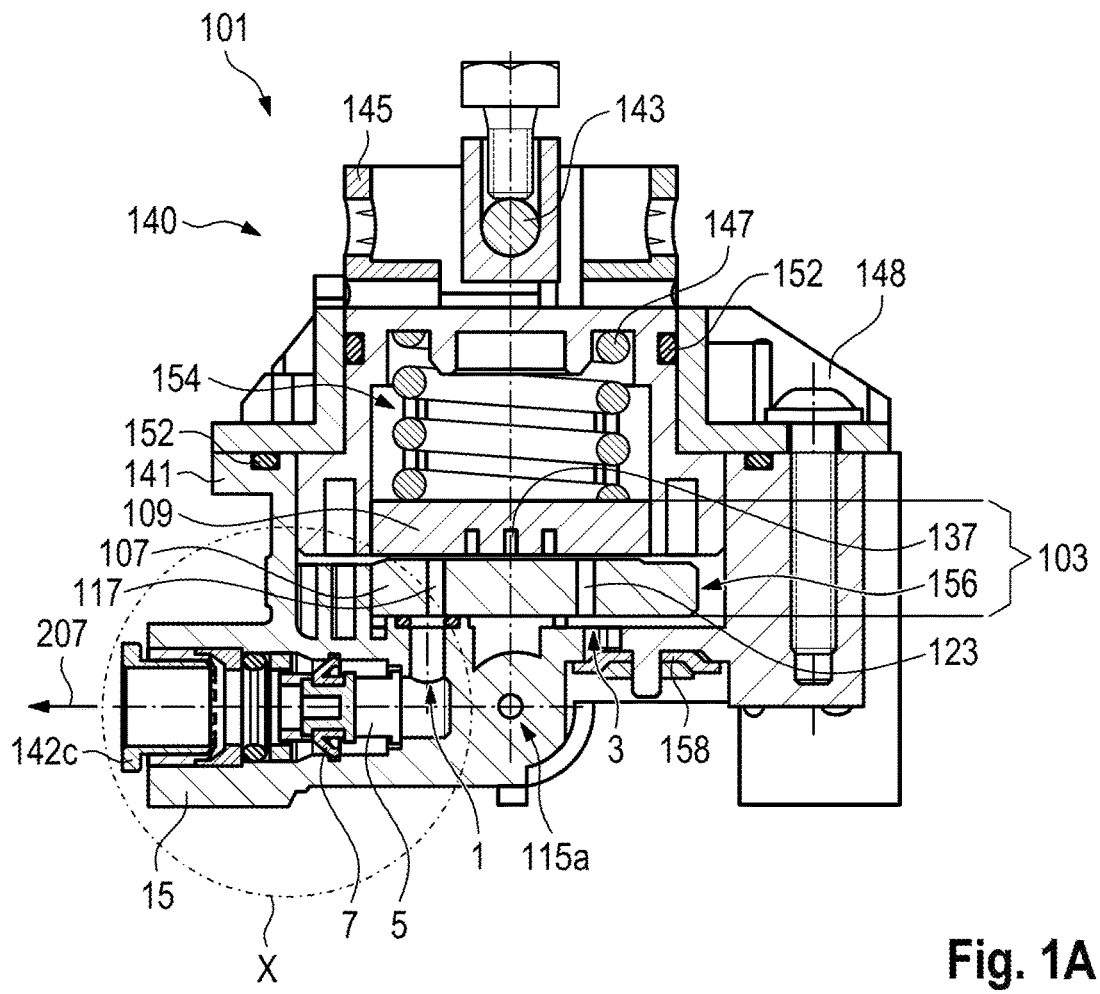
FIG. 1A shows a cross-sectional detailed view of a leveling valve according to an example including a noise reducing damping element as further shown in FIG. 2.
Figure 1B:
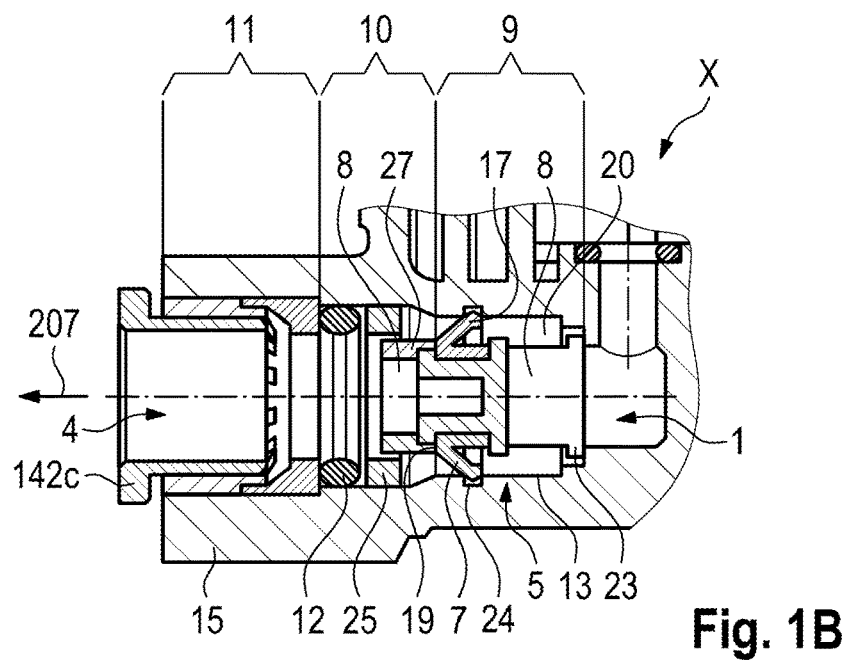
FIG. 1B shows a detailed view of FIG. 1A.
Figure 2:
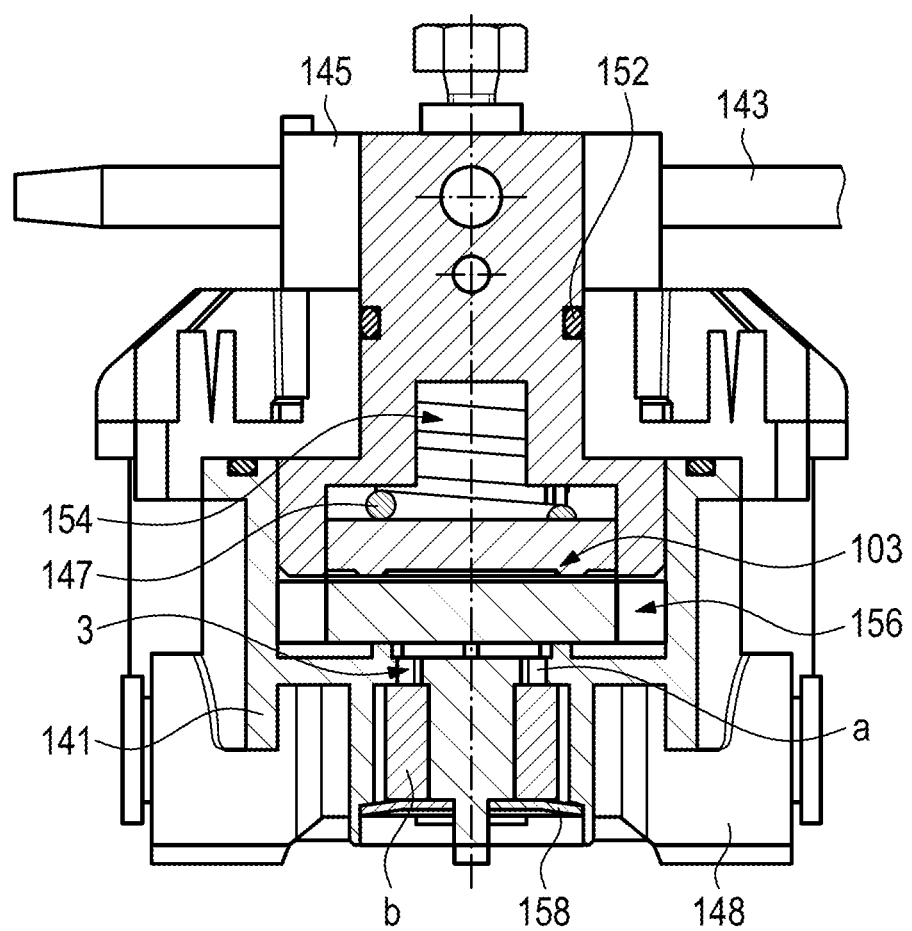
FIG. 2 shows a cross-sectional view of the leveling valve which is of more simplified manner as already described with FIG. 1A and FIG. 1B including the noise reducing damping element according to an example, with the same reference numerals being used to denote elements of similar kind and/or similar function.

A leveling valve 101 in accordance with an example of the invention is depicted in FIG. 1A and enlarged in a sectional view in FIG. 1B, and a simplified arrangement is depicted in FIG. 2. Thus, the further description equally relates to FIG. 1A, FIG. 1B and FIG. 2.

Figure 5:
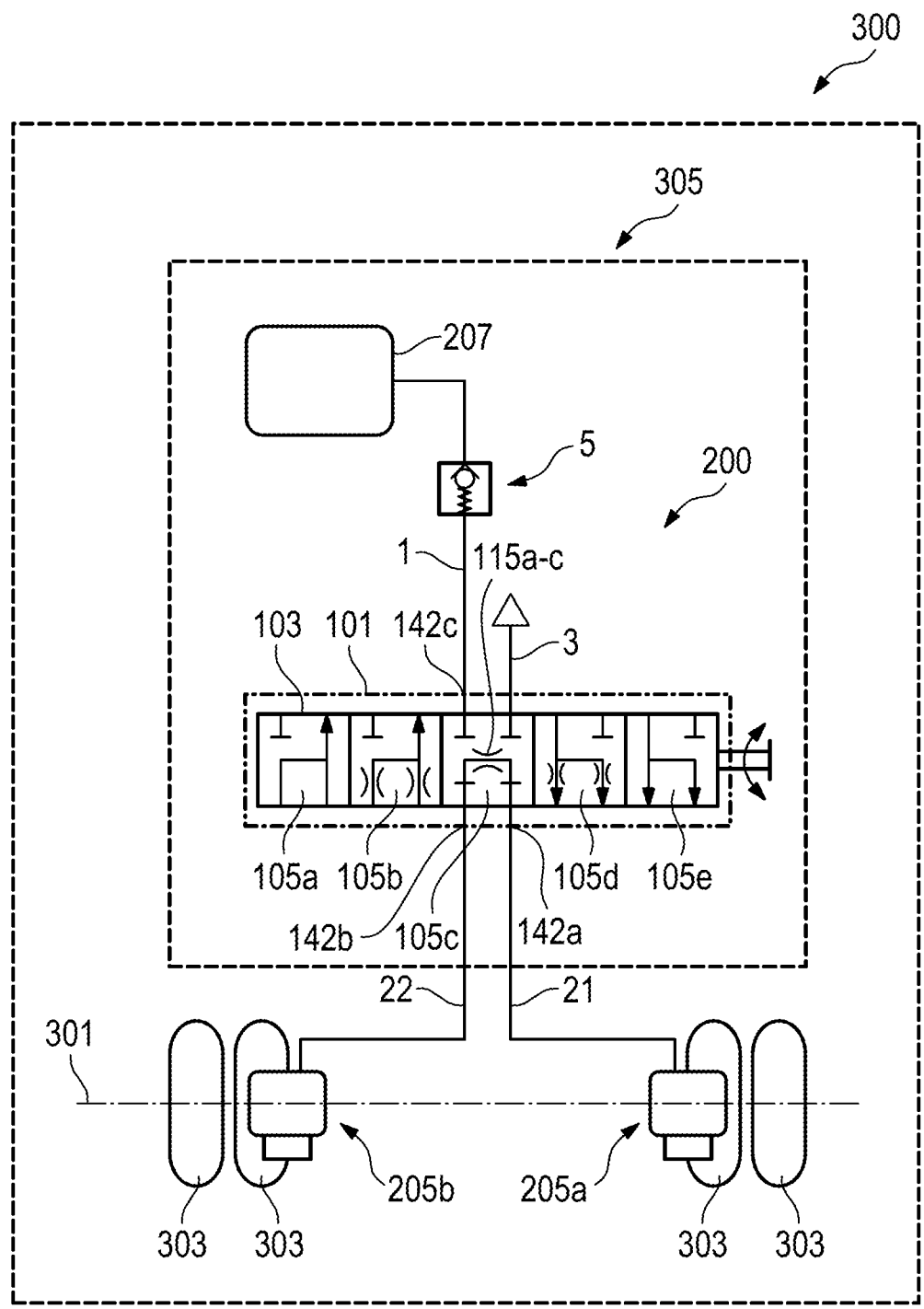
FIG. 5 shows a block diagram of a vehicle having an air suspension system for use in a vehicle as well as the leveling valve according to an example of the invention—namely e.g.

The leveling valve 101 comprises a valve arrangement 103 for directing air between (as shown in FIG. 5) a plurality of utilization elements 205a and 205b and either a source 207 of pressurized air or an exhaust port 3. The valve arrangement 103 is preferably a valve disc arrangement. It comprises a first valve disc 107 and a second valve disc 109. The first and second valve discs 107, 109 of the valve arrangement 103 comprise respective flow portions forming flow paths for guiding the air through the valve. The first and second valve discs 107, 109 are rotatable with respect to each other. The first valve disc 107 is mounted to be stationary inside a housing 140 of the leveling valve 101. The second valve disc 109 is mounted to be rotatable inside the housing 140. The housing 140 of the leveling valve 101 comprises a base body 141. The first valve disc 107 is mounted non-rotatably inside that base body 141. The housing 140 further comprises a rotatable housing part 145 which is fastened to the base body 141 by way of a housing lid 148 and extends into the base body 141. Inside a first air plenum 154 formed between the rotatable housing part 145 and the base body 141, a resilient means, for example in the form of a spring 147, is located and effective to push the second valve disc 109 towards the first valve disc 107 in order to establish a sealing, preferably air-tight relationship between the valve discs 107, 109 of the valve arrangement 103 and the housing, in particular with respect to the base body 141 of the housing 140—this is also clearly visible in FIG. 2.

The base body 141 of the housing 140 comprises (as shown in FIG. 5) a first fluid channel 21 at the end of which there is located a connector 142a for connecting the leveling valve 101 and in particular the first fluid channel 21 to a utilization element 205a of a vehicle (as shown in FIG. 5).

Further, the base body 141 comprises a second fluid channel 22. At the end of the second fluid channel 22 there is located a connector 142b for connecting the leveling valve 101 to a second utilization element 205b. Utilization elements 205a and 205b may for example be pneumatic suspension bellows of a truck vehicle, wherein the first utilization element 205a might be right side suspension bellow of a vehicle whereas the second utilization element 205b might be the left side suspension bellow of the vehicle, or vice versa.

The fluid channels 21, 22 are connected to respective flow portions in the first valve disc 107 of the valve arrangement 103.

The rotating portion 145 of the housing 140 comprises an external mounting section which in FIG. 1A receives a lever 143 for operating the valve 101. The lever comprises at its—in FIG. 1A—rightmost end portion a coupling means 150 engage a portion of the vehicle. Mechanical elements for translating a control motion from the vehicle to the valve 101 may be rollers, steering rods, etc. Upon actuation of the lever 143, the rotatable housing portion 145 is rotated relative to the base body 141 of the housing 140. The second valve disc 109 of the valve arrangement 103 is mounted non-rotatably with respect to the rotatable housing portion 145. Thus, upon actuation of the lever 143, the second valve disc 109 is rotated relative to the first valve disc 107 in this embodiment.

The base body 141 and the rotatable housing part 145, as well as the rotatable housing part 145 and the housing lid 148, are sealed against dirt ingress with one or more dirt seals 152. The first air plenum 154 is thus exposed to atmospheric pressure (as e.g. shown in FIG. 1A). The leveling valve 101 may optionally comprise a throttle 115a or 115c. FIG. 1A exemplarily shows throttle 115a which formed as a flow passage in the shape of a conical bore in the base body 141, connecting the first and second fluid channels 21, 22 with each other. There may be a throttle formed in a contact surface between the first and second valve discs 107, 109. Alternatively, there may be a throttle 115c formed in the first valve disc 107.

The fluid flow into and out of the leveling valve 101 are best seen from FIG. 1A; this is why in regard to reference signs, explicit reference is made to FIG. 1A and the air flow into and out of leveling valve 101 is accomplished as will be apparent hereinafter. The leveling valve 101 comprises in its base body 141 a fluid supply port 1. The fluid supply port 1 is in air-tight sealing contact with the first valve disc 107 and in fluid communication with a first air passage 117 in the first valve disc 107.

The fluid supply port 1 also comprises a connector 142c similar to connectors 142a and 142b (shown in FIG. 5) also shown in FIG. 1A, which lead to the utilization elements 205a and 205b. Connector 142c is adapted for connection to a source 207 of pressurized air.

Adjacent the connector 142c, the fluid supply port 1 houses a check valve 5 comprising a lip seal 7, wherein the lip seal 7 is configured to allow fluid flow inwards, towards the valve arrangement 103, and which is configured to prevent flow outwards, meaning from the valve arrangement 103 towards the source of pressurized air 207.

The check valve 5 is mounted directly adjacent the connector 142c and extends in a first elongate section 9, as e.g. shown in FIG. 1B. The lip seal 7 abuts against a wall 13 of the fluid supply port 1 in the first elongate section 9. Additionally, the fluid supply port 1 comprises a second elongate section 11 in which the connector 142c is mounted. In between the first and second elongate sections 9, 11, there is a transition zone 10, which comprises a conically tapered section. Optionally, a sealing element 12 may be arranged in between the check valve 5 and the connector 142c.

Through fluid supply port 1, pressurized air can be supplied through the first air passage 117 into a first flow portion 125 of the first valve disc 107 (FIG. 1A). Depending on the angle of rotation of the second valve disc 109 relative to the first valve disc 107, air will be transported in fluid communication through a crosslink portion 137 of the second valve disc 109 to second and third air passages 119, 121 in the first valve disc and from there to the first and second fluid channels 21, 22 which lead towards the utilization elements 205a and 205b. In the other switching scenario, air is being transported through the fluid channels 21, 22 and the second and third air passages 119, 121 of the first valve disc 107 into the second valve disc 109, through a second flow portion 127 in the second valve disc 109 and from there to a fourth air passage 123 in the first valve disc 107. The fourth air passage 123 in the first valve disc 107 is fluid communication with a second air plenum 156.

With continued reference to the reference signs mentioned with respect to FIG. 1A and FIG. 1B further details of the check valve 5 are described. The check valve 5 has an inlet side 4 and an outlet side 6. A flow path 8 is defined in between the inlet side 4 and the outlet side 6. The flow path is delimited by a base body 15 of the check valve 5 and the lip seal 7. When mounted, as shown in FIG. 1A, wall 13 of fluid supply port 1 also delimits the flow path 8.

The lip seal 7 comprises a sealing lip 17 and an annular base 19. The annular base 19 matingly engages a recess 24 formed in the base body 15. The mating engagement prevents inadvertent removal of the lip seal 7 from the base body 15 of the check valve 5.

Air streaming into the check valve 5 from the inlet side 4 is led from within the check valve 5 to the periphery 20 and onto the lip seal 7. After passing the lip seal 7, a recess provided in the base body 15 of the check valve 5 guides the flow path 8 back inside, away from the periphery 20 of the check valve 5.

On the outlet side 6 of the check valve 5, a number of positioning elements 23 are provided in the form of radial and/or axial protrusions, which act as end stops for the check valve 5 inside the fluid supply port 1. Also, the end stop at least axially defines the mounted position of the check valve 5 inside the fluid supply port 1. Optionally, the positioning elements 23 are formed such that they also position the check valve 5 radially in the fluid supply port 1 as a centering aid.

The check valve 5 comprises on the inlet side 4 a positioning element 25, which is in the form of a ring. The positioning element 25 protrudes radially from the check valve 5 in order to determine the radial position of the check valve 5 inside the fluid supply port 1.

Optionally, the base body 15 may comprise an end stop 27, which is adapted to be an abutment for the fluid conduit, which is introduced into the fluid supply port 1 and secured with the connector 142c. Also, the end stop 27 prevents the fluid conduit from being introduced too far into the fluid supply port and ensures that the recess 29 for guiding the flow path outwards to the periphery 20 remains sufficiently open.

As depicted in FIG. 1B the sealing lip 17 of lip seal 7 is inclined at an angle $\alpha$ (not shown) towards the outlet side 6 of the check valve 5. If an air flow enters check valve 5 from the outlet side 6 towards the sealing lip 17, the sealing lip is pressed against the inclination angle $\alpha$, which leads to the sealing lip 17 pressing tightly against the outer wall of the fluid supply port 1. Contrary thereto, when in normal operating condition, air streaming into the check valve 5 from the inlet side 4 will easily deform the sealing lip 17 to flex away from the outer wall 13 of the fluid supply port 1.

As can be seen from FIG. 1A, FIG. 1B and in particular now turning to FIG. 2 and also as shown further in FIG. 2, further an exhaust port 3 provided in the base body 141 of leveling valve 101 is in fluid communication with the second air plenum 156. The exhaust port 3 has an exhaust air channel a and is sealed against entry of air with an air flap 158 which opens if the pressure inside the second air plenum 156 is greater than the atmospheric pressure outside of valve 101. With reference to FIG. 2 and FIG. 3 the exhaust port 3 has an exhaust air channel a.

Figure 4:
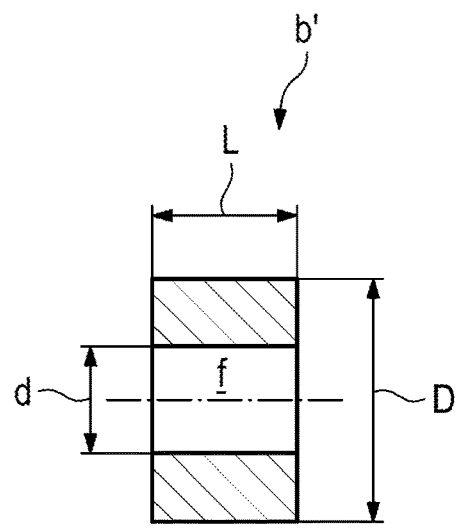
FIG. 4 shows an enlarged representation of the noise reducing damping element.

Further with reference to FIG. 4 the exhaust port 3 comprises at least one air-permeable damping element b, which is at least partly positioned within the exhaust air channel a. The damping element b has the shape of a cylindrical ring having an axial through bore f, this is as best shown in FIG. 4 a cylindrical ring damping element b'.

As shown in FIG. 4, the damping element b, —here the cylindrical ring damping element b'—has an outer diameter D in a range of D=15-19 mm, preferably 17 mm and/or an inner diameter d in a range of d=5.5-9.5 mm, preferably 7.5 mm and/or a length L, measured in the direction of the flow within the exhaust air channel, in the range of L=8-12 mm, preferably L=10 mm.

Figure 3A:
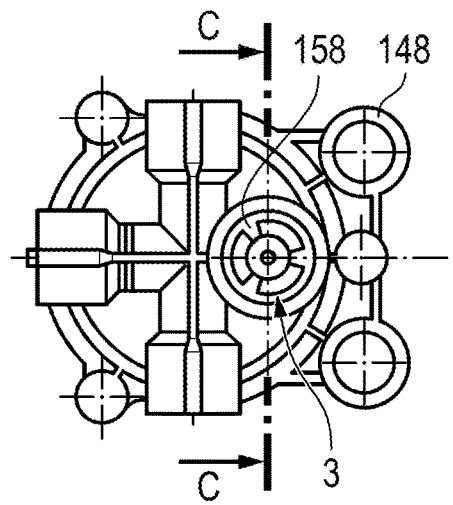
FIGS. 3A, 3B, and 3C show, in an enlarged representation, details of the leveling valve according to FIG. 2.
Figure 3B:
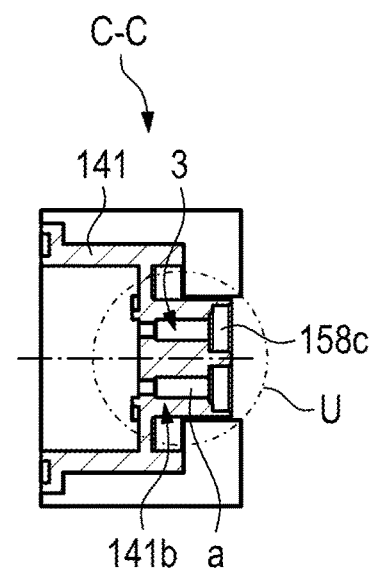
Figure 3C:
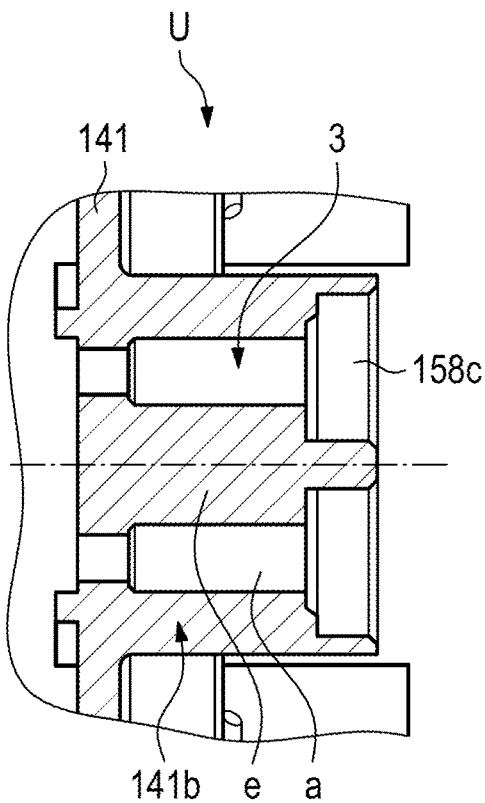

Now turning to FIGS. 3A, 3B, and 3C, cross-sectionally shown exhaust part 3 with exhaust air channel a is depicted in FIG. 3A in a bottom view and a cross-sectional view C-C of the bottom view is depicted in FIG. 3B—thus showing the base body of leveling valve 141 with the exhaust part 3 and the exhaust air channel a—an enlarged view thereof is given in FIG. 3C with detail U.

It is clear from this description that the damping element b shown as the cylindrical ring damping element b' in FIG. 4 is adapted to replace into the exhaust air channel a as best shown in FIG. 3. Also FIG. 3B and FIG. 3C thus technically show a particularly adapted space 158c to place the mentioned air flap 158 therein. Thus, the damping element b—here the cylindrical ring damping element b'—is positioned directly beneath the air flap 158 within the exhaust air channel a as already visible in the lower part of FIG. 3 in a cross-sectional view. So to say the side-by-side placement of FIG. 3C and FIG. 4 provides an explosion-type view of the lower part of FIG. 2 with the air permeable damping element b—here the cylindrical ring damping element b'—taken out of the exhaust air channel a.

As further can be seen from this structure depicted in FIG. 3C, the exhaust air channel is configured within the space body of leveling valve as a type of tubular recess such that the basically cylindrical ring damping element b' can be positioned therein.

In more detail the damping element b is positioned within a protruding, in particular a tubular sleeve extension section 141b connected with the base body 141 of the housing 140 of the leveling valve as shown in FIG. 3. In other words, damping element b is positioned adjacent to and upstream of an air flap 158 as shown in FIG. 1A and a washer element (not shown, but near the air flap 158) within the exhaust air channel a. The damping element b is positioned around a central positioning element e extending through an axial through bore f of the damping element b and being positioned centrally within the exhaust air channel a.

Accordingly, the damping element b—here the cylindrical ring damping element b'—is positioned around a central positioning element e extending through an axial bore f of the damping element b and being positioned centrally within the exhaust air channel a, and wherein the damping element b—here the cylindrical ring damping element b'—is positioned within a tubular sleeve or tubular section of the housing of the leveling valve. The damping element has a density in the range of 0.19+/−0.1 g/cm$^3$ and/or an air permeability of or above 200 L/min and/or a diameter/length ratio in the range of 1.7.

FIG. 5 shows an exemplary use of the valve 101 according to the examples of FIGS. 1 to FIG. 4. In particular, FIG. 5 schematically shows a vehicle 300. The vehicle 300 comprises an axle 301 supporting a number of tires 303. The tires 303 and the axle 301 are linked through an air suspension system 200 to a superstructure 305.

The air suspension system 200 comprises a plurality of utilization elements 205a and 205b such as pneumatic suspension bellows. The utilization elements 205a and 205b are functionally linked to the axle 301 and/or optionally directly to a single-tire support (not shown).

The utilization elements 205a and 205b are connected through a first fluid channel 21 and a second fluid channel 22 to the valve disc arrangement 103 of valve 101. Upon rotation of a lever (not shown in FIG. 5), such as lever 143 of FIG. 1, the valve 101 can be. Depending on the switching position, air is transported from the utilization elements through the valve 101 to an exhaust port 3.

Alternatively, air can be supplied from a source 207 of pressurized air through fluid supply port 1 to the valve 101 and from thereon to the utilization elements 205a and 205b.

In this Specification, reference numerals have been used to represent the following elements:

1 fluid (air) supply port
3 fluid (air) exhaust port
a exhaust air channel
b damping element
b' cylindrical ring damping element
e central positioning element
f axial through bore of the damping element
L length
4 inlet side
5 check valve
6 outlet side
7 lip seal
8 flow path
9 first elongate section
10 transition section
11 second elongate section
12 sealing element
13 outer wall
15 base body
17 sealing lip
19 annular base
20 outer periphery
21 first fluid (air) channel
22 second fluid (air) channel
23 (second) positioning element
24 recess
25 (first) positioning element
27 end stop
29 (first) recess
31 (second) recess
101 leveling valve
103 valve arrangement
107 first valve disc
109 second valve disc
115a,c throttle
117 first air passage (for connection to source of pressurized air)
119 second air passage (for connection to first utilization element)
121 third air passage (for connection to second utilization element)
123 fourth air passage (for connection to air exhaust)
125 first flow portion (of first air passage)
127 second flow portion (of fourth air passage)
137 crosslink flow portion
140 housing
141 base body of leveling valve
141s tubular sleeve extension section as a protruding, connected with the base body 141
142a and 142b,c connectors
143 lever
145 rotatable housing port
147 spring
148 housing lid
150 coupling means
152 dirt seal
154 first air plenum
156 second air plenum
158 air flap
158c space
200 Air suspension system
205a and 205b utilization elements, in particular in the form of suspension bellows
207 source of pressurized air
300 vehicle
301 vehicle axle
303 tire 305 superstructure
α inclination angle

What is claimed is:

1. A leveling valve (101) for discharging and supplying air from and to a plurality of utilization elements (205a, b), the leveling valve comprising:
   a valve arrangement (103) for directing air between a source (207) of pressurized air, an exhaust port (3) and the utilization elements,
   a supply port (1) in fluid communication with the valve arrangement (103) and the source (207) of pressurized air, and
   an exhaust port (3) having an exhaust air channel (a) for discharging exhaust air,
   wherein the exhaust port (3) includes at least one air-permeable damping element (b), which is at least partly positioned within the exhaust air channel (a) upstream of an air flap (158).

2. The leveling valve (101) of claim 1, wherein the damping element (b) comprises a textile material.

3. The leveling valve (101) of claim 2, wherein the textile material contains at least one member of the group consisting of felt, wool felt, plastic felt, nonwovens or textile mesh.

4. The leveling valve (101) of claim 1, wherein the damping element (b) has a density of 0.19+/−0.1 g/cm3.

5. The leveling valve (101) of claim 1, wherein the damping element (b) has an air permeability within the range of 190-210 L/min.

6. The leveling valve (101) of claim 1, wherein the damping element (b) has an oil absorption capability in a range of 360-420% by weight.

7. The leveling valve (101) according to claim 1, wherein the damping element (b) is positioned within a tubular recess within the housing (140), of the leveling valve (101).

8. The leveling valve (101) according to claim 7, wherein the damping element (b) is positioned within a protruding tubular sleeve extension section (141s) of a base body (141) of the housing (140).

9. The leveling valve (101) according to claim 1, wherein the damping element (b) is positioned around a central positioning element (e) extending through an axial through bore (f) of the damping element (b) and being positioned centrally within the exhaust air channel (a), and
   wherein the damping element (b) is positioned within a tubular sleeve section (141s) of the housing (140), in particular base body (141), of the leveling valve (101), and wherein the damping element has at least one of the following properties:
   a density in the range of 0.19+/−0.1 g/cm3;
   an air permeability of or above 200 L/min; or
   a diameter (D)/length (L) ratio in the range of 1.5 to 2.

10. An air suspension system (200) for a vehicle (300), the suspension system comprising
    a plurality of utilization elements (205a and 205b),
    the leveling valve (101) according to claim 1 for discharging and supplying air from and to the utilization elements (205a and 205b), and
    a source (207) of pressurized air connected to a fluid supply port (1) of the leveling valve (101).

11. A vehicle (300) comprising a plurality of tires (303) mounted on a vehicle axle (301), a superstructure (305), and the air suspension system (200) according to claim 1, the air suspension system (200) coupling the axle (301) to the superstructure (305).

12. A leveling valve (101) for discharging and supplying air from and to a plurality of utilization elements (205a, b), the leveling valve comprising:
    a valve arrangement (103) for directing air between a source (207) of pressurized air, an exhaust port (3) and the utilization elements,
    a supply port (1) in fluid communication with the valve arrangement (103) and the source (207) of pressurized air, and
    an exhaust port (3) having an exhaust air channel (a) for discharging exhaust air,
    wherein the exhaust port (3) includes at least one air-permeable damping element (b), which is at least partly positioned within the exhaust air channel (a),
    wherein the damping element (b) is ring-shaped.

13. The leveling valve (101) according to claim 12, wherein the damping element (b) is formed as a cylindrical ring having a axial through bore (f) with an inner diameter (d) of the axial through bore (f) being in a range of 6-8 mm.

14. The leveling valve (101) of claim 12,
    wherein the damping element (b) has at least one of the following properties:
    an outer diameter (D) within a range of 15-19 mm;
    an inner diameter (d) within a range of 5.5-9.5 mm, or
    a length (L), measured in a flow direction within the exhaust air channel (a), in a range of 8-12 mm.

* * * * *